Patented Jan. 24, 1939

2,145,016

UNITED STATES PATENT OFFICE 2,145,016

PROCESS OF INCORPORATING PECTIN IN BAKERY PRODUCTS

Clarence G. Spalding, Milford, Conn., assignor of one-half to George R. Gould, New Haven, Conn.

No Drawing. Original application February 20, 1934, Serial No. 712,136. Divided and this application May 6, 1936, Serial No. 78,073

4 Claims. (Cl. 167—56)

This invention relates to a method of preparing improved bakery products, cereals, breakfast foods, etc., which contain an added bulk-giving and laxative constituent and have laxative and bulk-giving properties, but which are free from the objections of common laxative preparations.

This application is a division of my application Serial No. 712,136, filed February 20, 1934 which has issued as Patent No. 2,043,204, June 2, 1936.

Many substances have been proposed and used as laxatives, cathartics, aperients and purgatives, including drugs of various kinds, saline solutions, etc. Cereal bran and psyllium seeds have been used as bulk-giving materials, and for their laxative action, but the extensive use of these products is recognized to have distinct objections. Agar-agar has been used as a bulk-giving material, but its use apparently promotes bacterial growth in the intestinal tract, due to its property of serving as a culture medium.

The present invention provides improved bakery products, cereals, breakfast foods, etc., containing an active bulk-giving and laxative constituent which does not have the objectionable properties of other laxative preparations, or which has them to a very slight degree, and which provides a natural action which is desirable.

The active constituent in the bakery products, cereals, breakfast foods, etc., is fruit pectin, and the proportion of pectin contained in the products is such that ordinary rations contain a sufficient amount of pectin to provide effective laxative action.

Pectin is readily extracted from fruits of various kinds, and, in different forms, is on the market as an article of commerce. Its main field of use is in the manufacture of jellies. It has such pronounced jelling properties that only around one half of one percent. of pectin is commonly used, together with a large amount of sugar, and fruit acids, in making jelly, the jelly containing, for example, around 65% of sugar, around one half of one percent. pectin, a small percentage of fruit acids, and the remainder mainly water or fruit juices. In such jellies the amount of pectin is so small that the amount of jelly which would ordinarily be eaten would have little if any laxative action.

But I have found that when pectin is taken in sufficiently large amounts, for example, in amounts of around 25 to 30 grains per dose, the pectin forms a most valuable material for giving bulk to the contents of the intestines, keeping the contents of the intestines in a desirable moist condition, and promoting normal peristaltic action and evacuation.

Pectin is made commercially from different fruits and is prepared in a dry state in various forms. It differs somewhat in its composition, depending upon the fruit from which it is extracted, the condition of the fruit at the time of extraction, the method employed, etc. With such different pectins, the amount required for the proper laxative dose will vary somewhat, but in general, with the pectin I have used, I have found that around 25 to 35 grains of pectin provided an adequate dose.

Pectin, however, cannot be readily taken in its dry powdered state. It readily swells in contact with water or with the secretions of the mouth to form a treacle-like or mucilage-like mass. It forms a satisfactory mucilage with good adhesive properties in water solutions containing only around 3 to 6% of pectin.

In my prior application Serial No. 712,136, I have described and claimed means by which these difficulties in the administration of pectin can be overcome by combining with the pectin in a dry state an inhibitor of the dissolving and swelling tendency of the pectin, thereby avoiding the objections of present pectin preparations.

According to the present invention, the pectin is incorporated in bread, crackers, pastries, or other bakery products, or in cereals, such as flaked cereals, breakfast foods, etc. This incorporation of the pectin in the bakery products or other products is advantageously accomplished by admixing the pectin with, and coating it by, an edible oil or fat or fatty acid, and incorporating the resulting coated pectin with the other materials of the dough batches. In this way, the pectin is kept from direct contact with the aqueous liquids used in the dough batches, and is prevented from dissolving or swelling therein. For example, the pectin, in a finely powdered condition, can be admixed with and thereby coated with a liquid oil or fat or fatty acid, or a normally semi-solid or solid fat or fatty acid in a melted condition. If the pectin is not in a sufficiently finely divided form, it can be ground in suspension in such a liquid oil or fat to a sufficiently fine state of subdivision. The pectin so protected can be admixed with the ingredients of the dough batch, such as is used for bread, pastry and cracker manufacture, etc., where the material used for the protective coating will serve as a shortening agent as well as for inhibiting or preventing the dissolving or swelling of the pectin in the aqueous liquids. In this way, a sufficiently large amount of pectin may be readily incorporated in the dough batch to enable an individual ration of the final product to contain an adequate amount of pectin to insure the desirable laxative action. Bread, crackers, pastry and other bakery products, as well as cereals and breakfast foods, etc., can thus be prepared with an adequate content of pectin to obtain the desired bulk-giving and moisture-retaining properties desirable for laxative purposes in food products.

When the pectin is so incorporated in the dough batches, the amount of fat or oil used to coat the pectin may be but a small percentage of the amount of pectin, but it should be sufficient to coat all particles of the pectin so that, when the product is cooled and solidified, the pectin will be held in a solidified matrix of the fat or oil. If a more or less completely hydrogenated oil is used for admixture with the pectin, the solidified product will be sufficiently hard and brittle to enable it to be ground to facilitate its admixture with the dough batch or with the other materials from which the bakery products, cereal products, breakfast foods, etc., are made. Of course, where the pectin is admixed with an oil or fat, and the oil or fat serves as a shortening agent in the bakery products, the amount used should be adjusted so that sufficient oil or fat is supplied for shortening, or a part of the shortening may be supplied otherwise than in admixture with the pectin.

The pectin so compounded may be used as such, or it can be admixed with other constituents such as flour or starch in proportions such as to give a relatively dry, pulverulent mixture.

I claim:

1. The process of incorporating pectin in bakery products, cereals, breakfast foods, etc., which comprises coating the pectin, in finely divided form, with an inhibitor which inhibits the dissolving or swelling of the pectin in contact with aqueous liquids, and incorporating such coated pectin in the dough or other material from which the final product is made.

2. The process of incorporating pectin in bakery products, cereals, breakfast foods, etc., which comprises coating the pectin, in finely divided form, with a water-resistant, oily or fatty material, which inhibits the dissolving or swelling of the pectin in contact with aqueous liquids, and incorporating such coated pectin in the dough or other material from which the final product is made.

3. The process of incorporating pectin in bakery products, cereals, breakfast foods, etc., which comprises coating the pectin, in finely divided form, with stearic acid, which inhibits the dissolving or swelling of the pectin in contact with aqueous liquids, and incorporates such coated pectin in the dough or other material from which the final product is made.

4. The process of incorporating pectin in bakery products, which comprises coating the pectin, in finely divided form, with an inhibitor which inhibits the dissolving or swelling of the pectin in contact with aqueous liquids and which will act as a shortening agent in the bakery product, and incorporating such pectin in the dough or other material from which the final product is made.

CLARENCE G. SPALDING.